United States Patent
Ang et al.

(10) Patent No.: US 6,744,587 B2
(45) Date of Patent: Jun. 1, 2004

(54) MOTOR CONTROL CIRCUIT WITH ADAPTIVE CONTROLLER PATH SELECTION FOR DIFFERENT LOAD CONDITIONS

(75) Inventors: Djunaedy Chandra Ang, Singapore (SG); KianKeong Ooi, Singapore (SG); Liang Shen, Singapore (SG); WingKong Chiang, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 296 days.

(21) Appl. No.: 10/035,081

(22) Filed: Dec. 21, 2001

(65) Prior Publication Data

US 2003/0007278 A1 Jan. 9, 2003

Related U.S. Application Data

(60) Provisional application No. 60/302,198, filed on Jun. 29, 2001.

(51) Int. Cl.[7] ............................................. G11B 15/18
(52) U.S. Cl. .................................... 360/69; 318/254
(58) Field of Search ............................. 360/73.03, 69, 360/78.13, 98.05; 318/254, 560, 561

(56) References Cited

U.S. PATENT DOCUMENTS

| | | |
|---|---|---|
| 4,130,769 A | 12/1978 | Karube |
| 4,169,990 A | 10/1979 | Lerdman |
| 4,405,885 A | 9/1983 | Okamoto |
| 4,531,079 A | 7/1985 | Müller |
| 4,631,459 A | 12/1986 | Fujioka et al. |
| 4,633,150 A | 12/1986 | Inaji et al. |
| 4,712,050 A | 12/1987 | Nagasawa et al. |
| 4,748,386 A | 5/1988 | Nakanishi et al. |
| 4,888,533 A | 12/1989 | Gotoh et al. |
| 4,896,807 A | 1/1990 | Mundschau |
| 4,992,710 A | 2/1991 | Cassat |
| 5,001,405 A | 3/1991 | Cassat |
| 5,028,852 A | 7/1991 | Dunfield |
| 5,117,165 A | 5/1992 | Cassat et al. |
| 5,159,246 A | 10/1992 | Ueki |
| 5,166,583 A | 11/1992 | Min et al. |
| 5,184,038 A | 2/1993 | Matsui et al. |
| 5,189,574 A | 2/1993 | Imamura et al. |
| 5,254,914 A | 10/1993 | Dunfield et al. |
| 5,274,310 A | 12/1993 | Bahn |
| 5,285,135 A | 2/1994 | Carobolante et al. |
| 5,289,097 A | 2/1994 | Erickson et al. |
| 5,298,839 A | 3/1994 | Takeda |
| 5,334,917 A | 8/1994 | Lind |
| 5,343,127 A | 8/1994 | Maiocchi |
| 5,350,990 A * | 9/1994 | Austermann et al. ....... 318/701 |
| 5,378,976 A | 1/1995 | Inaji et al. |
| 5,397,972 A | 3/1995 | Maiocchi |
| 5,428,276 A | 6/1995 | Carobolante et al. |
| 5,541,488 A | 7/1996 | Bansal et al. |
| 5,586,306 A * | 12/1996 | Romano et al. ............ 711/112 |
| 5,631,999 A | 5/1997 | Dinsmore |

(List continued on next page.)

Primary Examiner—David Hudspeth
Assistant Examiner—Fred F. Tzeng
(74) Attorney, Agent, or Firm—Fellers, Snider, et al.

(57) ABSTRACT

A motor control circuit for controlling rotation of a motor includes parallel first and second controller paths (gears). Each path includes a proportional and integral (PI) controller and a digital to analog converter (DAC). The DACs operate over different dynamic ranges (gains). The respective PI controllers have different control parameters to provide a common frequency response. The first controller path is used to output motor control signals to control the application of drive current to the motor. The circuit switches to the second controller path once the first controller path operates within a selected tolerance of a minimum or maximum level of the first dynamic range. The final state of the first PI controller is used to configure the initial state of the second PI controller to eliminate transients. The use of different gears allows the circuit to adaptively accommodate large variations in motor current and spindle motor configurations.

20 Claims, 4 Drawing Sheets

U.S. PATENT DOCUMENTS

| | | |
|---|---|---|
| 5,703,449 A | 12/1997 | Nagate et al. |
| 5,777,448 A | 7/1998 | Matsui |
| 5,780,983 A | 7/1998 | Shinkawa et al. |
| 5,821,717 A | 10/1998 | Hassan et al. |
| 5,841,252 A | 11/1998 | Dunfield |
| 5,869,946 A | 2/1999 | Carobolante |
| 5,870,363 A | 2/1999 | Sun et al. |
| 5,929,577 A | 7/1999 | Neidorff et al. |
| 5,963,706 A | 10/1999 | Baik |
| 5,982,571 A | 11/1999 | Calfee et al. |
| 5,998,946 A | 12/1999 | Kim |
| 6,020,664 A * | 2/2000 | Liu et al. .................... 310/90 |
| 6,054,828 A | 4/2000 | Hill |
| 6,057,978 A | 5/2000 | Hayakawa |
| 6,078,158 A | 6/2000 | Heeren et al. |
| 6,081,091 A * | 6/2000 | Mitchell et al. ............ 318/685 |
| 6,100,656 A | 8/2000 | El-Sadi et al. |
| 6,130,868 A | 10/2000 | Yamamoto |
| 6,160,367 A | 12/2000 | Higashi et al. |
| 6,236,536 B1 * | 5/2001 | Ma et al. .................. 360/99.08 |
| 6,323,617 B1 | 11/2001 | Maruyama et al. |
| 6,326,756 B1 | 12/2001 | Youn |
| 6,540,148 B1 * | 4/2003 | Salsbury et al. .......... 236/1 EA |
| 6,643,088 B1 * | 11/2003 | Kawachi ...................... 360/75 |
| 6,664,749 B2 * | 12/2003 | Heydt et al. ................ 318/254 |

* cited by examiner

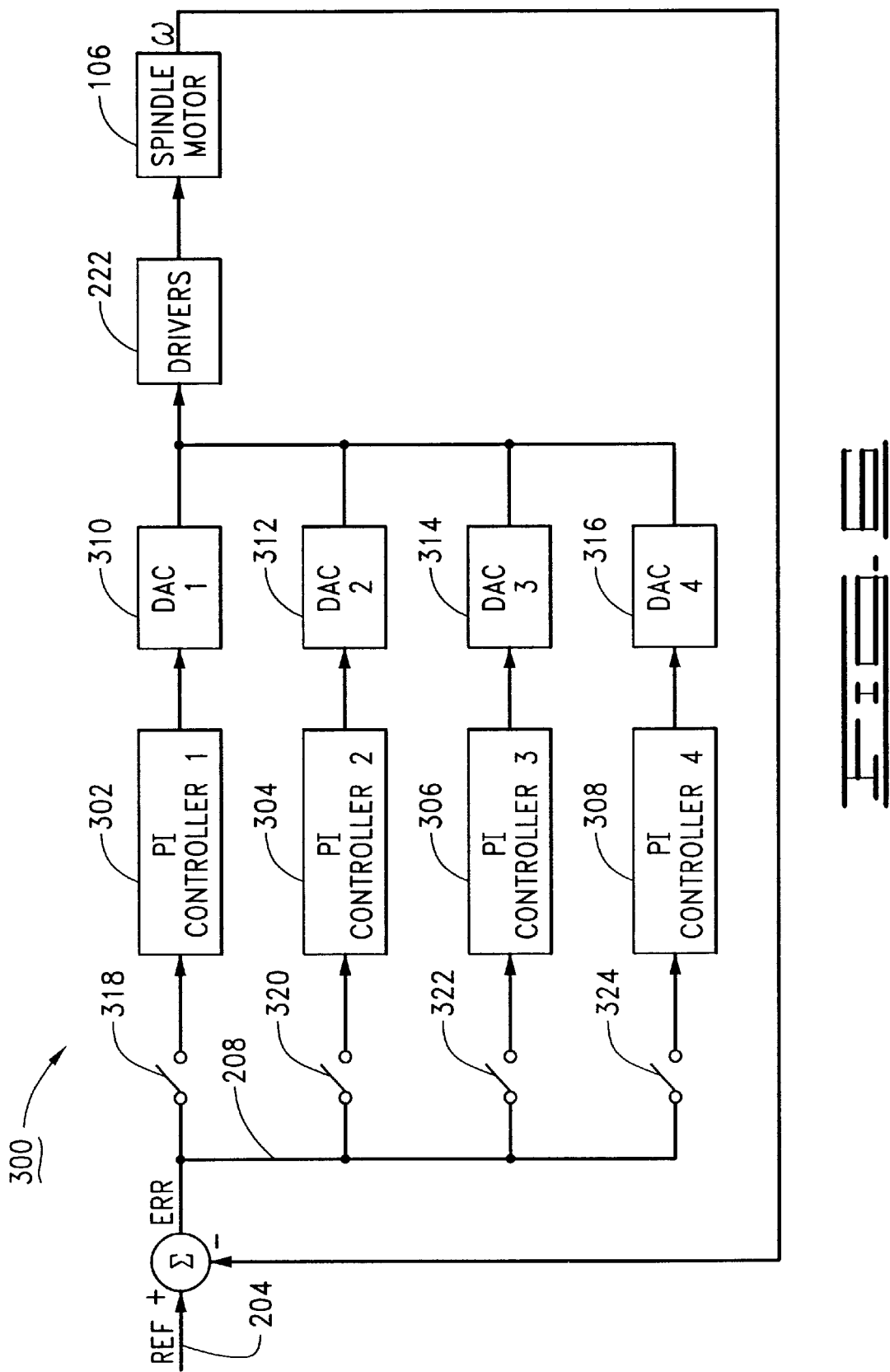

MOTOR CONTROL CIRCUIT WITH ADAPTIVE CONTROLLER PATH SELECTION FOR DIFFERENT LOAD CONDITIONS

RELATED APPLICATIONS

This application claims priority to U.S. Provisional Application No. 60/302,198 filed Jun. 29, 2001.

FIELD OF THE INVENTION

The claimed invention relates generally to the field of motor control circuits, and more particularly but not by way of limitation, to an apparatus and method for adaptively controlling a motor by providing multiple parallel controller paths (gears) which are adaptively selected to accommodate different load conditions of the motor.

BACKGROUND OF THE INVENTION

A disc drive is a data storage device for storing digital data. The disc drive magnetically records digital data on circular, concentric data tracks on the surfaces of one or more rigid discs. The discs are rotated by a spindle motor at a constant high speed. The data are recorded to and retrieved from the discs by an array of vertically aligned read/write head assemblies, or heads, which are controllably positioned by an actuator assembly.

Disc drive spindle motors typically have a multi-phase direct current (dc) brushless motor configuration. The phase windings are arranged about a stationary stator on a number of radially distributed poles. A rotatable spindle motor hub is provided with a number of circumferentially extending permanent magnets in close proximity to the poles. Application of current to the windings induces electromagnetic fields that interact with the magnetic fields of the magnets to apply torque to the spindle motor hub and to cause rotation of the discs.

A particular disc drive product can have several different configurations to satisfy different capacity/price point needs. For example, a fully populated drive in a particular series might have two discs and four heads, whereas a depopulated model might have the same overall mechanical structure but only have a single disc and two heads. As would be expected, increasing the number of discs increases the required current to rotate the spindle motor at a given operational speed.

The use of motors with hydrodynamic bearings (fluid-bearing motors) adds another option to the disc drive configuration. While providing smoother operation and lower noise, a spindle motor with hydrodynamic bearings typically requires more current to drive the motor than an equivalent spindle motor that uses ball bearings. Moreover, spindle motors that use hydrodynamic bearings experience a temperature effect where the current required to drive the spindle motor increases substantially at lower temperatures due to the viscosity characteristics of the lubricant within the bearings.

Disc drive manufacturers typically qualify multiple sources (vendors) for system components to assure adequate availability and cost levels. Slight variations in operational performance can occur in spindle motors from different sources as well as in spindle motors from the same source but from different manufacturing lots.

These and other factors have affected the ability of disc drive designers to optimize the control electronics (spindle control loop) used to control rotation of the spindle motor. An optimal setting for one configuration of spindle motor may not provide enough current or enough control resolution for another configuration. One approach to overcome this problem involves releasing different firmware code sets to cover each possible combination. While ensuring that the code for each different configuration will be optimized, logistical considerations make implementation of this approach difficult and costly during manufacturing.

Another approach is to implement a single set of firmware code that covers all of the different possible configurations and environmental conditions (such as temperature) and rely upon detection techniques such as taught by U.S. Pat. No. 6,057,981 issued to Fish et al. or U.S. Pat. No. 6,078,158 issued to Heeren et al. to select the correct spindle control loop parameters during operation. While viable, limitations with this approach include the required complexity of the code to account for numerous different mechanical and operational configurations of the drive, as well as the possibility for error in the detection operation, leading to a mismatch of spindle loop parameters.

SUMMARY OF THE INVENTION

In accordance with preferred embodiments, a disc drive is provided with a spindle motor configured to rotate a magnetic recording disc at a constant high speed.

Motor control circuitry is provided having parallel first and second controller paths. Each path includes a controller and a digital to analog converter (DAC). Each controller preferably has a proportional and integral (PI) controller configuration and establishes an integrator value in relation to a motor speed error signal and an integrator value. The controllers use the integrator values to generate first and second reference signals.

The DACs output respective first and second motor current adjustment signals over respective, different first and second dynamic ranges (gains) in response to the reference signals from the respective controllers. Exemplary values include a fullscale interval of 0.1 volts for the first dynamic range and a fullscale interval of 0.2 volts for the second dynamic range. Each range provides different maximum current values and different resolutions (volts per count).

Any number of a plurality of controller paths can be used as desired. In accordance with preferred embodiments, the circuit operates to select the first controller path to modulate an amount of drive current applied to the motor. Upon sensing the first controller path to be operating within a selected tolerance of a minimum or maximum value of the respective dynamic range, the circuit switches gears so that the second controller path is used to modulate the current provided to the motor. The circuit configures the second controller path in relation to the final existing state of the first controller path to reduce introduction of transients in the motor. Such configuration preferably includes calculation of a new integrator value for the second PI controller. When the PI controllers output pulse width modulation (PWM) signals, such configuration also preferably includes selection of an initial PWM duty cycle for the second PI controller in relation to the final PWM duty cycle of the first PI controller.

The circuit operates to repetitively verify whether the selected controller path is adequate for the existing load of the motor, and changes to a new controller path as needed to maintain desired stability and resolution in the system. The use of multiple controller paths (gears) accommodates a large variation in spindle motor current and a large number of different spindle motor configurations. The circuit also effectively compensates for changes in operational conditions (such as temperature) without the need for external sensing since gear changes are based on the operational conditions of the currently selected controller path.

These and various other features as well as advantages which characterize embodiments of the claimed invention will become apparent upon reading the following detailed description and upon reviewing the associated drawings.

BRIEF DESCRIPTION OF THE DRAWINGS

FIG. 6 depicts another spindle motor control loop operated in accordance with preferred embodiments of the present invention.

DETAILED DESCRIPTION

Figure 1:
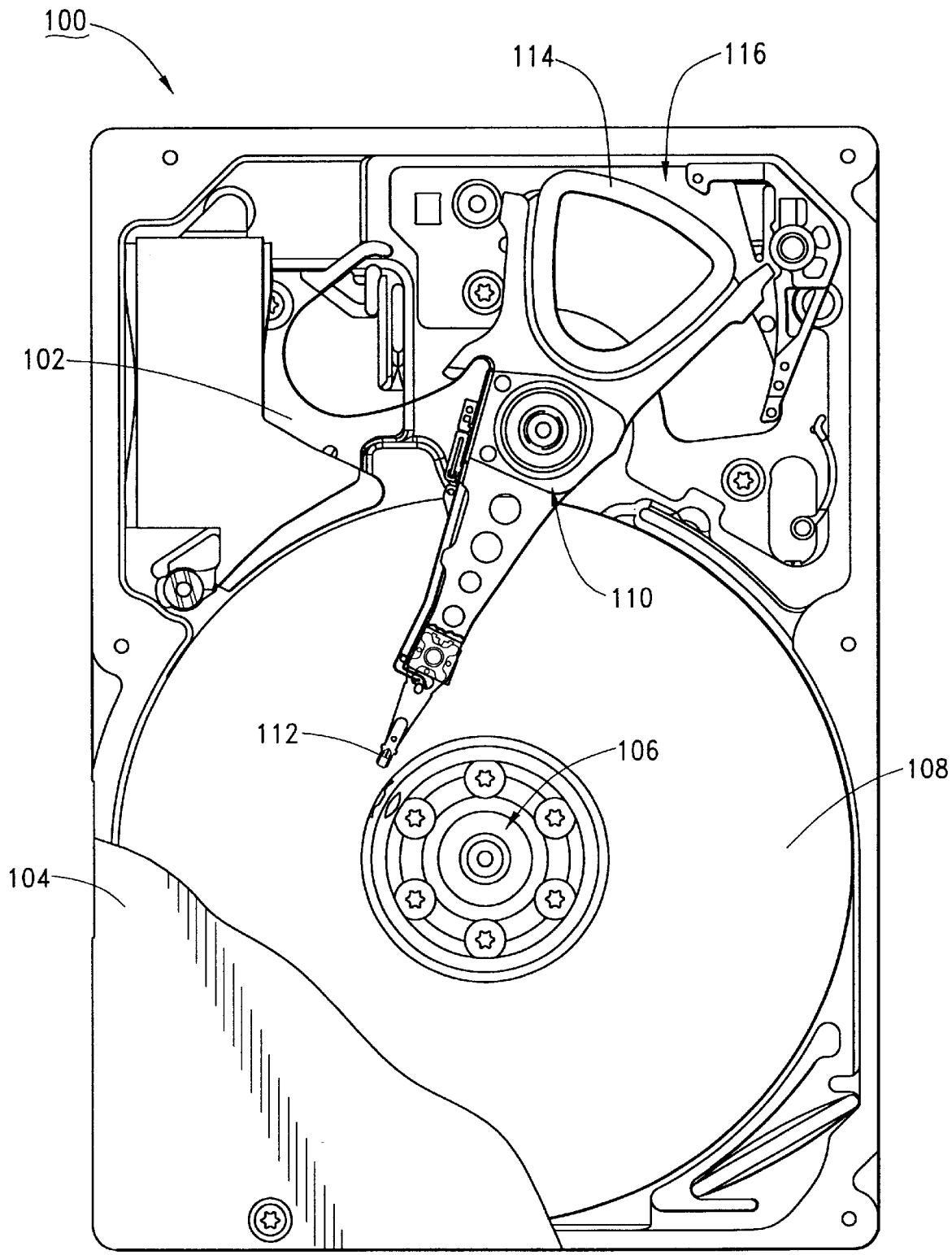
FIG. 1 is a plan view of a disc drive constructed in accordance with preferred embodiments of the present invention.

FIG. 1 provides a top plan view of a disc drive 100 constructed in accordance with preferred embodiments of the present invention. A base deck 102 and a top cover 104 (shown in partial cutaway) cooperate to form a sealed housing for the disc drive 100. A spindle motor 106 rotates a number of magnetic recording discs 108 about a central axis at a constant, high speed. An actuator assembly 110 supports an array of read/write heads 112. The actuator assembly 110 is pivotally moved through the application of current to an actuator coil 114 of a voice coil motor (VCM) 116.

Figure 2:
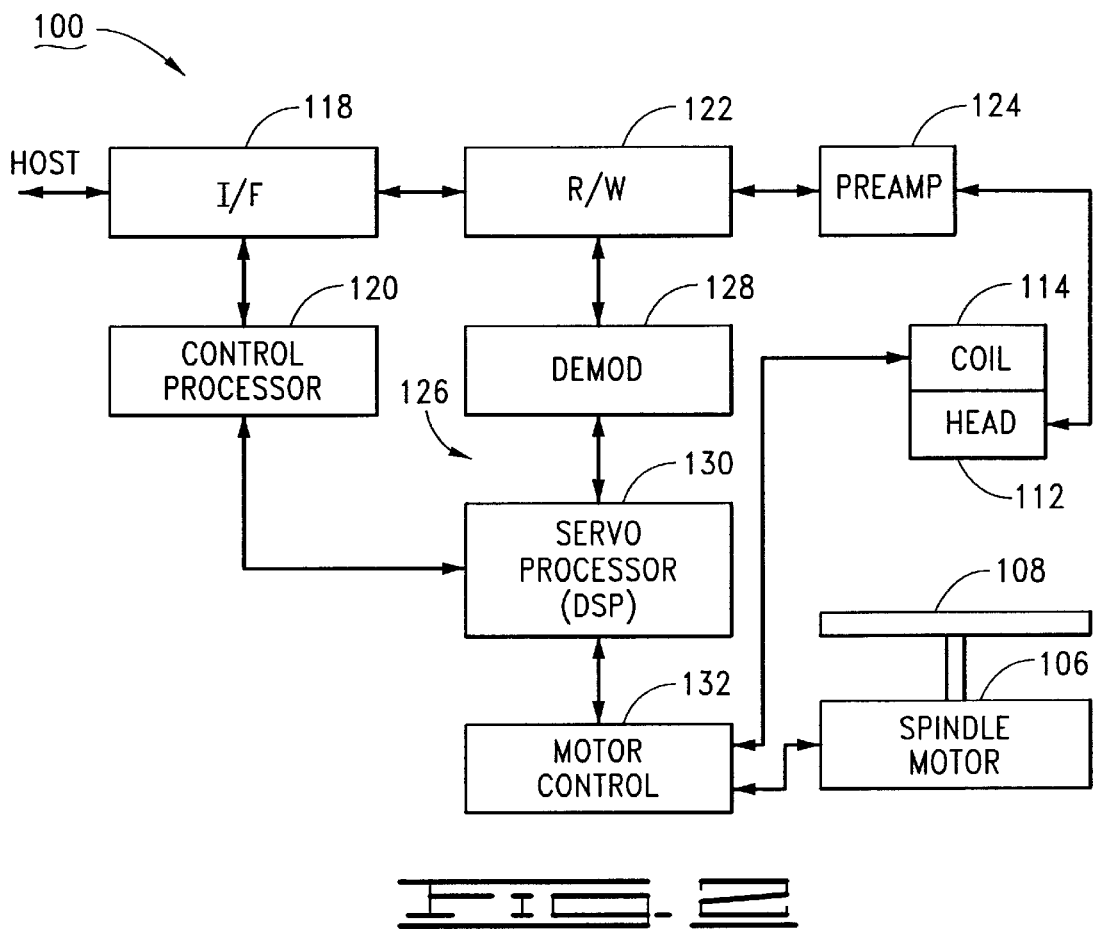
FIG. 2 is a functional block diagram of the disc drive of FIG. 1.

FIG. 2 provides a functional block diagram of the disc drive 100. Data and host commands are provided from a host device to the disc drive 100 using interface (I/F) circuitry 118 in conjunction with a top level control processor 120. Data are transferred between the discs 108 and the host device using the I/F circuitry 118, a read/write (R/W) channel 122, and a preamplifier/driver (preamp) circuit 124.

Head positional control is provided by a closed-loop servo circuit 126 comprising demodulation (demod) circuitry 128, a servo processor 130 (preferably comprising a digital signal processor, or DSP) and motor control circuitry 132. The motor control circuitry 132 applies drive currents to the actuator coil 114 to rotate the actuator 110. The motor control circuitry 132 further applies drive signals to the spindle motor 106 to rotate the discs 108.

Figure 3:
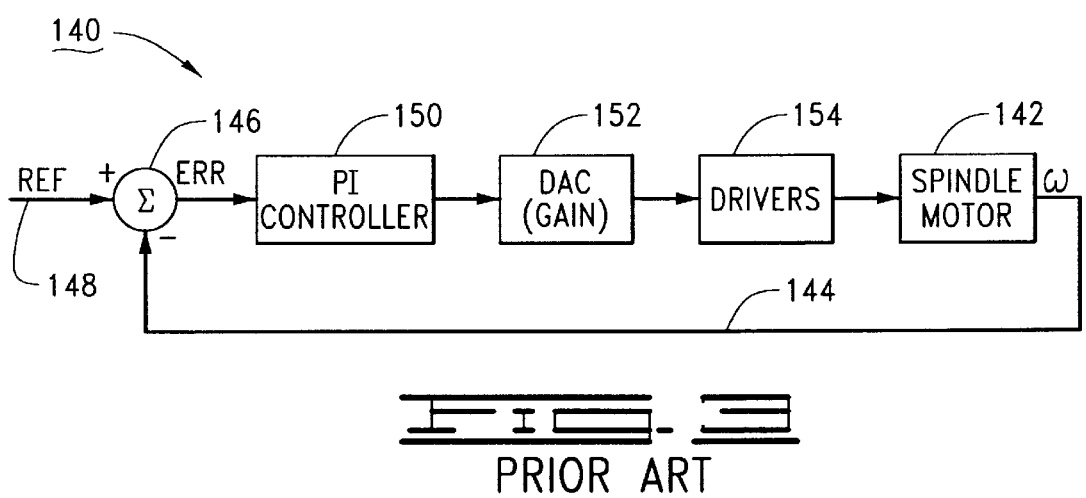
FIG. 3 depicts a prior art spindle motor control loop.

FIG. 3 depicts a typical prior art spindle motor control loop 140. An actual rotational speed of a spindle motor 142 is represented by speed signal ω on path 144. The actual speed signal is summed at summing junction 146 with a reference speed signal REF on path 148 to provide a speed error signal as an input to a conventional proportional-and-integral (PI) controller 150. The PI controller 150 generates an output reference signal such as in accordance with the following relationship:

$$u(t)=K_P e(t)+K_I \int e(t)dt \quad (1)$$

where u(t) is the output signal, e(t) is the input signal, and $K_I$ and $K_P$ are selectable control parameters (constants). It will be noted that other forms of operation of the PI controller can be used other than that shown in equation (1).

The PI controller output can comprise a pulse width modulated (PWM) signal or a sequence of multibit digital values. The output from the PI controller 150 is provided to a digital to analog converter (DAC) block 152 which converts the reference signal to analog form over a fullscale (dynamic) range. This is referred to as the gain of the DAC. The corresponding analog reference signal is used by a driver circuit 154 to control the application of current to the spindle motor 142. The dynamic range of the DAC 152 is typically selected to limit the maximum current applied to the spindle motor 142.

A common way to compensate for load variability among different configurations of spindle motor is to set the dynamic range of the DAC to compensate for the worst case scenario (i.e., the configuration that utilizes maximum current). This approach is adequate if the load variability is relatively small among various configurations. However, if the variation is too great, the performance in other cases with lower nominal current levels will suffer as the dynamic range of the DAC 152 will be too large to provide adequate resolution.

Figure 4:
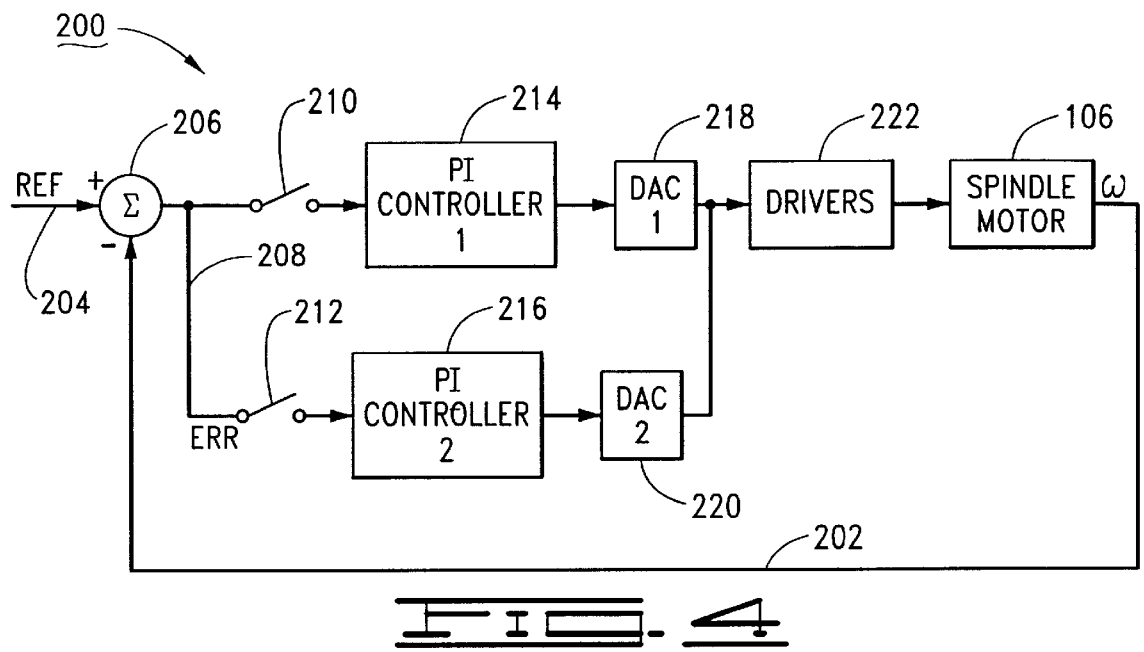
FIG. 4 depicts a spindle motor control loop operated in accordance with preferred embodiments of the present invention.

Accordingly, FIG. 4 shows a spindle motor control loop 200 constructed and operated in accordance with preferred embodiments of the present invention. It will be understood that the spindle motor control loop 200 generally represents operation of selected portions of the motor control circuit 132 in FIG. 2.

The control loop 200 uses an adaptive gear-shift method that introduces two parallel controller paths (gears) with respective settings to match the requirements of different configurations. It will be understood that additional gears can be readily provided as desired so that the present invention, as claimed below, is not limited to the use of just two controller paths.

As with the circuit of FIG. 3, an actual speed signal is provided on path 202 and summed with a reference signal REF on path 204 by a summing junction at 206. The output comprises an error signal ERR which is provided on path 208, which has two branch lines each with an associated switch 210, 212, one of which is selected at a time.

A pair of PI controllers 214, 216 operate to output PWM or digital reference values to respective DACs 218, 220. The DACs 218, 220 have different respective fullscale ranges and the PI controllers 214, 216 have different control parameter settings. Depending on the respective settings of the switches 210, 212, a selected one of the DACs 218, 220 will provide an analog reference signal to a driver circuit 222 in order to control application of current to the spindle motor 106.

The control loop 200 can be operated in a variety of ways. In a first approach, upon motor initialization the lower gear (i.e., the controller path having a lower dynamic range) can be used first. A detection scheme can be activated at each sampling time to determine whether there is a need to switch to the higher gear. This approach may tend to require longer time to achieve full rotational speed, but will promote higher stability in the system.

A second, alternative approach is to start in the higher gear and then activate a detection scheme to determine whether there is a need to switch to the lower gear. This approach can advantageously reduce the time required to reach the operating speed of the spindle motor, but it entails a greater risk because the system may encounter overshoots as the system transitions from the higher gear to the lower gear.

Figure 5:
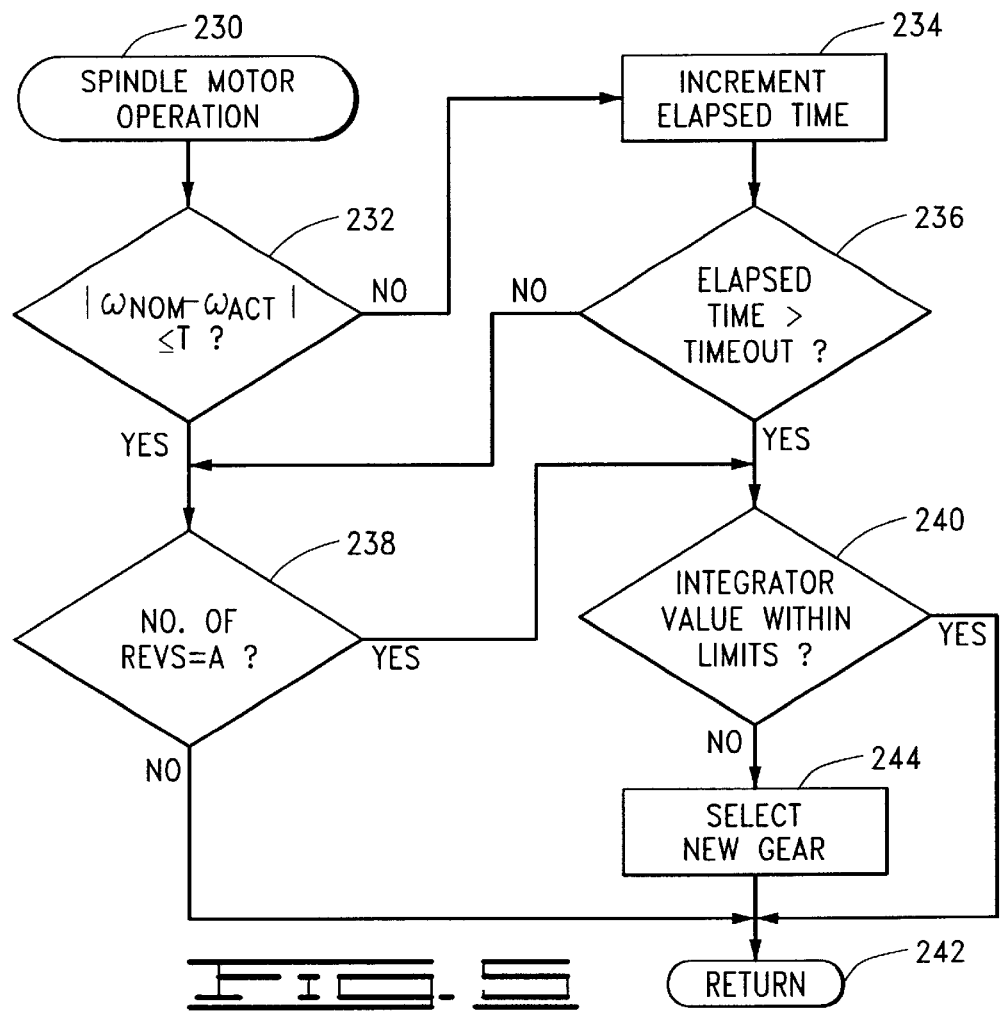
FIG. 5 is a flow chart for a SPINDLE MOTOR OPERATION routine illustrative of steps carried out in accordance with preferred embodiments of the present invention detection scheme used with the gear-shift method.

FIG. 5 provides a flow chart for a SPINDLE MOTOR OPERATION routine 230 illustrative of steps carried out in accordance with preferred embodiments in operation of the control loop 200 of FIG. 4. The routine of FIG. 5 generally operates to detect whether the present gain setting (gear selection) is appropriate for existing spindle motor current requirements. It will be understood that the disc drive 100 carries out a number of conventional operations in addition to those shown in FIG. 5 during operation of the spindle motor, and the disc drive 100 preferably performs the routine of FIG. 5 during each sampling time.

The routine is shown at step 232 to determine whether the actual spindle motor speed $_{ACT}$ is within a selected tolerance T of a nominal (reference) spindle motor speed $_{NOM}$; that is, whether $$|\omega_{NOM} - \omega_{ACT}| \leq T \quad (2)$$

An exemplary value of T might be 0.05 $_{NOM}$ and an exemplary value of the nominal spindle motor speed $_{NOM}$ might be the operational speed of the spindle motor (such as around 10,000 revolutions per minute). Thus, the operation of decision step 232 determines whether the actual speed of the motor 106 is within ±5% of the desired operational speed. If not, the routine passes to step 234 wherein an elapsed time count is incremented, with the elapsed time count tracking the elapsed time since motor initialization. Decision step 236 inquires whether the total elapsed time has exceed a maximum timeout value; if not, the routine passes to a decision step 238 which inquires whether the total number of revolutions has reached a value A, indicative of a desired sampling rate for checking whether a different gear should be selected. This provides a level of filtering by limiting the rate (time interval) at which the controller paths are switched. However, this step can be eliminated as desired so that the inquiry can be made at each sampling time.

Decision step 240 inquires whether the existing controller (either 214 or 216) is operating within preselected limits of the respective output range. One approach is to examine the integrator value I, defined as:

$$I = K_I \int e(t) dt \quad (3)$$

and to compare the integrator value to an integrator value range of between predetermined limits $I_{MIN}$ and $I_{MAX}$. An alternative approach to the inquiry of step 240 is to examine the respective value of the PI controller output. For example, if the output of the selected controller is a PWM signal, step 240 might inquire whether the duty cycle of the latest PWM signal is between 20 and 80 percent; if the output of the selected controller is a digital value over a range of digital values, step 240 might inquire whether the most recent value is between 20 and 80 percent of the overall range.

In either case, if the selected PI controller 214, 216 is operating within the desired range no adjustments are necessary and the routine returns at step 242. On the other hand, if the selected PI controller 214, 216 is not operating in the desired range, the routine passes to step 244 wherein a new gear is selected, after which the routine returns at step 242.

With reference again to FIG. 4, selection of a new gear at step 244 schematically entails the toggling of the switches 210, 212 so that a different PI controller 214, 216 and DAC 218, 220 are switched into the circuit. It is desirable to attempt to provide seamless transition between the respective controller paths to reduce transients and instability in the system. The following transition equations are derived for a PWM based controller system, and can be readily modified if the reference signals are multibit digital values.

Define the PWM duty cycle in terms of a variable SPINPWM, which represents the number of bits during which PWM signal is low ($T_{OFF}$). Let $$\delta = \frac{T - X}{T} = 1 - \frac{X}{T} \quad (4)$$

where is the PWM duty cycle, T is the period and X is the SPINPWM ($T_{OFF}$) value. Select 0.1 volts and 0.2 volts as the respective dynamic ranges of the DACs 218, 220 and assume that the particular transition at step 244 at the present time involves switching from 0.1 volts to 0.2 volts. For smooth transition, it can be seen that the new duty cycle should be half of the old duty cycle to maintain the same amount of current flowing in the motor. Hence, $$\delta_{NEW} = 0.5 \delta_{OLD} \quad (5)$$

where $_{OLD}$ is the initial PWM duty cycle and $_{NEW}$ is the new PWM duty cycle. Using equation (4), $$1 - \frac{X_{NEW}}{T} = 0.5 \left(1 - \frac{X_{OLD}}{T}\right) \quad (6)$$

which provides $$X_{NEW} = \frac{T}{2} + \frac{X_{OLD}}{2} \quad (7)$$

Thus, conversion will include setting the initial PWM cycle to match $X_{NEW}$ in accordance with equation (7). The next step is to obtain the appropriate integrator value I for the new PI controller 214, 216. Let the control equation of the PI controller be written as:

$$u = CV + eK_P + IK_I \quad (8)$$

where CV is the existing center value, u is the output, e is the error (input), I is the integrator value, and $K_I$ and $K_P$ are the control parameters of the controller. If the center value is chosen as T/2 and the system is approaching stability, equation (8) can be simplified to:

$$u = \frac{T}{2} + IK_I \quad (9)$$

Since X is proportional to u, equation (7) can be rewritten as follows:

$$X_{NEW} = \frac{T}{2} + \frac{X_{OLD}}{2} \quad (10)$$

$$\left(\frac{T}{2} + K_I I_{NEW}\right) = \frac{T}{2} + \frac{1}{2}\left(\frac{T}{2} + K_I I_{OLD}\right)$$

$$\left(\frac{T}{2} + K_I I_{NEW}\right) = \frac{T}{2} + K_I \left(\frac{T}{4K_I} + \frac{I_{OLD}}{2}\right)$$

which provides $$I_{NEW} = \frac{T}{4K_I} + \frac{I_{OLD}}{2} \quad (11)$$

Thus, the newly selected PI controller 214, 216 will use $I_{NEW}$ as the loaded integrator value as determined from equation (11). Conversion in the opposite direction (i.e., from a dynamic range of 0.2 to 0.1 volts) can be carried out in a similar manner using algebraic manipulations as presented above. Conversion factors for various other possible dynamic ranges are also calculated in a similar manner as that presented above.

FIG. 6 shows another spindle motor control loop 300 similar to the control loop 200 shown in FIG. 4, except that the control loop 300 includes a total of four parallel controller paths made up of PI controllers 302, 304, 306 and 308 and DACs 310, 312, 314 and 316. The respective controller paths are individually selected by switches 318, 320, 322 and 324. It will be noted that any number of a plurality of controller paths can be used as desired.

Accordingly, it will now be understood that the present invention (as embodied herein and as claimed below) is generally directed to an apparatus and method for controlling a motor. In accordance with preferred embodiments, a disc drive (such as 100) is provided with a spindle motor (such as 106) configured to rotate a magnetic recording disc (such as 108) at a constant high speed.

Motor control circuitry (such as 200) is provided having parallel first and second controller paths. Each path includes a controller (such as 214, 216) and a digital to analog converter (DAC, such as 218, 220). The controllers generate respective first and second reference signals in response to motor speed error (such as on path 202) and the DACs output respective first and second motor current adjustment signals over respective, different first and second dynamic ranges (gains). A processor (such as 130) provides top level control.

The circuitry operates to connect the first controller path to the driver circuitry to rotate the motor until the first controller path operates within a selected threshold of a maximum or minimum level of the first dynamic range (such as by step 240), after which the circuit transitions to the second controller path, or changes gear (such as by step 244) so that the motor current is controlled by the second control path. The final state of the first controller path is preferably used to configure the initial state of the second control path to reduce transients in the motor. During subsequent operation, continued switching takes place between the first and second controller paths so that the first and second controller paths are sequentially used in relation to changes in magnitude of drive current applied to the motor.

Preferably, the controllers each comprise a proportional and integral (PI) controller which establishes an integrator value in relation to a motor speed error signal. The integrator value of the associated PI controller is compared to a preselected range of $I_{MIN}$ to $I_{MAX}$ and the circuit changes gears when the integrator value exceeds the preselected range (step 244).

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application of the motor control system without departing from the spirit and scope of the present invention.

In addition, although the embodiments described herein are directed to a motor control circuit for use in a disc drive, it will be appreciated by those skilled in the art that the motor control system can be used for other devices without departing from the spirit and scope of the claimed invention.

What is claimed is:

1. A method for controlling a motor, comprising:
   providing parallel first and second controller paths each having different respective control parameter settings and each configured to output a speed adjustment signal over a different respective dynamic range;
   selecting the first controller path to output a first speed adjustment signal to modulate an amount of drive current applied to the motor;
   sensing the first speed adjustment signal from the first controller path to be within a selected tolerance of a minimum or maximum value of the respective dynamic range; and
   switching to the second controller path to output a second speed adjustment signal to modulate the amount of drive current applied to the motor, wherein upon switching the second controller path is configured in relation to an existing state of the first controller path to reduce introduction of transients in the motor.

2. The method of claim 1, further comprising repeating the selecting, sensing and switching steps during operation of the motor so that the first and second controller paths are sequentially used in relation to changes in magnitude of drive current applied to the motor.

3. The method of claim 1, wherein each of the first and second controller paths of the providing step comprises a proportional and integral (PI) controller and a digital to analog converter (DAC), wherein each DAC receives a reference signal from the associated PI controller and outputs the speed adjustment signal as an analog voltage over a selected dynamic range.

4. The method of claim 3, wherein the sensing step comprises steps of comparing an integrator value I of the associated PI controller with a preselected range of $I_{MIN}$ to $I_{MAX}$.

5. The method of claim 4, wherein the switching step comprises steps of using the integrator value from the PI controller of the first controller path to determine a new integrator value for the PI controller of the second controller path, and loading the new integrator value into the PI controller of the second controller path.

6. The method of claim 3, wherein the reference signal from the associated PI controller comprises a pulse width modulation (PWM) signal having an associated duty cycle, and wherein the switching step comprises initially setting the duty cycle of the associated PI controller of the second controller path in relation to the duty cycle of the associated PI controller of the first controller path.

7. The method of claim 3, wherein each associated PI controller generates the reference signal in accordance with the relationship $u(t)=K_P e(t)+K_I \int e(t)dt$, where u(t) represents the reference signal, e(t) represents an input error signal indicative of motor speed error, and $K_P$ and $K_I$ are control parameter values, and wherein the control parameter values of the respective PI controllers are selected to obtain a nominally consistent frequency response.

8. The method of claim 1, wherein the motor comprises a spindle motor in a disc drive data storage device which supports a rotatable magnetic recording disc.

9. The method of claim 1, further comprising:
   providing a third controller path in parallel with the first and second controller paths having different respective control parameter settings and configured to output a speed adjustment signal over a respective dynamic range different from the respective dynamic ranges of the first and second controller paths;
   sensing the second speed adjustment signal from the second controller path to be within a selected tolerance of a minimum or maximum value of the respective dynamic range; and switching to the third controller path to output a third speed adjustment signal to modulate the amount of drive current applied to the motor.

10. The method of claim 1, wherein the motor comprises a spindle motor in a disc drive data storage device which supports a rotatable magnetic recording disc.

11. A motor control circuit for controlling rotation of a motor, comprising:

a first controller path comprising a first controller which generates a first reference signal in response to a motor speed error signal indicative of motor speed error and a first digital to analog converter (DAC) which generates a motor current adjustment signal over a first dynamic range in response to the first reference signal;

a second controller path connected in parallel with the first controller path and comprising a second controller which generates a second reference signal in response to the motor speed error signal and a second digital to analog converter (DAC) which generates a motor current adjustment signal over a second, different dynamic range in response to the second reference signal;

driver circuitry which applies drive current to the motor in response to the motor current adjustment signals; and a processor which selectively operates to connect the first controller path to the driver circuitry to rotate the motor, and which subsequently operates to disconnect the first controller path and connect the second controller path when the first controller path operates within a selected threshold of a maximum or minimum level of the first dynamic range, wherein the processor further initially configures the second controller path in relation to an existing state of the first controller path upon disconnection of the first controller path.

12. The motor driver circuit of claim 11, wherein the processor proceeds to switch between the first and second controller paths during operation of the motor so that the first and second controller paths are sequentially used in relation to changes in magnitude of drive current applied to the motor.

13. The motor driver circuit of claim 11, wherein the first and second controllers respectively comprise first and second proportional and integral (PI) controllers which generate the respective reference signals in relation to the motor speed error signal.

14. The motor driver circuit of claim 13, wherein the processor determines the first controller to be operating within a selected threshold of the maximum or minimum level of the first dynamic range in relation to a magnitude of an integrator value determined in relation to the motor speed error signal.

15. The motor driver circuit of claim 13, wherein the processor uses the integrator value from the first PI controller to determine a new integrator value for the second PI controller, and loads the new integrator value into the second PI controller upon switching to the second controller path.

16. The motor driver circuit of claim 11, wherein the reference signals from the first and second controllers each comprise a pulse width modulation (PWM) signal having an associated duty cycle, and wherein the processor sets the duty cycle of the second controller in relation to the duty cycle of the first controller upon switching to the second controller path.

17. A disc drive, comprising:

a spindle motor configured to rotate a magnetic recording disc at a nominal operating speed;

driver circuitry configured to apply drive current to the spindle motor in relation to analog motor speed adjustment signals; and first means for respectively generating the analog motor speed adjustment signals over different first and second dynamic ranges by generating a first analog motor speed adjustment signal over the first dynamic range and then transitioning to generate a second analog motor speed adjustment signal over the second dynamic range when the first analog motor speed adjustment signal operates within a tolerance of a minimum or maximum level of the first dynamic range, and for reducing transients in the spindle motor during said transitioning to the second dynamic range.

18. The disc drive of claim 17, wherein the first means comprises a motor driver circuit comprising:

a first proportional-and-integral (PI) controller arranged to receive a motor speed error signal;

a first digital to analog converter (DAC) arranged in series with the first PI controller and the driver circuitry to receive a first reference signal from the first PI controller and output the first analog motor control signal over the first dynamic range;

a second PI controller arranged to receive the motor speed error signal; and a second DAC arranged in series with the second PI controller and the driver circuitry to receive a second reference signal from the second PI controller and output the second analog motor control signal over the second dynamic range, wherein the second PI controller and the second DAC are connected in parallel with the first PI controller and the first DAC.

19. The disc drive of claim 18, wherein an integrator value of the first PI controller determined in relation to the motor speed error signal is used to generate an initial integrator value of the second PI controller upon transitioning to the second dynamic range.

20. The disc drive of claim 18, wherein the first and second reference signals from the first and second PI controllers each comprise a pulse width modulation (PWM) signal having an associated duty cycle selected in relation to motor speed error, and wherein the duty cycle of the first reference signal is used to establish an initial duty cycle of the second reference signal upon transitioning to the second dynamic range.

* * * * *